United States Patent
Snider et al.

(10) Patent No.: US 10,524,313 B2
(45) Date of Patent: Dec. 31, 2019

(54) REAR SLIDER WINDOW ASSEMBLY WITH LAMINATED HEATING ELEMENT

(71) Applicant: MAGNA MIRRORS OF AMERICA, INC., Holland, MI (US)

(72) Inventors: Darin J. Snider, Holland, MI (US); David K. Johnson, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 58 days.

(21) Appl. No.: 15/890,387

(22) Filed: Feb. 7, 2018

(65) Prior Publication Data

US 2018/0227986 A1    Aug. 9, 2018

Related U.S. Application Data

(60) Provisional application No. 62/456,845, filed on Feb. 9, 2017.

(51) Int. Cl.
| | |
|---|---|
| *E06B 1/00* | (2006.01) |
| *H05B 3/86* | (2006.01) |
| *E06B 7/28* | (2006.01) |
| *B60J 1/18* | (2006.01) |
| *B60R 16/02* | (2006.01) |
| *B32B 17/06* | (2006.01) |
| *B60R 16/027* | (2006.01) |
| *E06B 3/46* | (2006.01) |

(52) U.S. Cl.
CPC .............. *H05B 3/86* (2013.01); *B32B 17/061* (2013.01); *B60J 1/1853* (2013.01); *B60R 16/0207* (2013.01); *B60R 16/027* (2013.01); *E06B 7/28* (2013.01); *B32B 2605/006* (2013.01); *E06B 3/4618* (2013.01); *H05B 2203/016* (2013.01)

(58) Field of Classification Search
CPC ................ H05B 3/86; H05B 2203/013; H05B 2203/016; B60J 1/1853; B60R 60/0207; B60R 16/027; E06B 7/28; E06B 3/4627
USPC .................................................... 49/380, 413
See application file for complete search history.

(56) References Cited

U.S. PATENT DOCUMENTS

| | | | |
|---|---|---|---|
| 957,728 | A | 5/1910 | Bliss |
| 1,204,702 | A | 11/1916 | Schupp |
| 2,762,675 | A | 9/1956 | Janows |
| 2,858,408 | A | 10/1958 | Barroero |
| 2,912,714 | A | 11/1959 | Rich |
| 2,962,773 | A | 12/1960 | Heller |

(Continued)

*Primary Examiner* — Jerry E Redman
(74) *Attorney, Agent, or Firm* — Honigman LLP

(57) ABSTRACT

A rear slider window assembly for a vehicle includes a fixed window panel and a movable window panel that is movable between a closed position and an opened position. The movable window panel includes a laminated movable window panel having an electrical element disposed between an inner glass panel and an outer glass panel. The first electrical element is in electrical connection with a wire harness of the vehicle via a flexible connector electrically connected to a first electrical connector at an inner surface of the movable window panel and to a second electrical connector at the inner surface of the fixed window panel. The first electrical connector is electrically connected to the first electrical element via a thin flat connector that extends from the first electrical connector and wraps around a perimeter edge of the inner glass panel of the movable window panel.

20 Claims, 12 Drawing Sheets

(56) References Cited

U.S. PATENT DOCUMENTS

| | | | |
|---|---|---|---|
| 3,177,989 A | 4/1965 | Di Chiaro |
| 3,237,250 A | 3/1966 | Scoville |
| 3,379,859 A | 4/1968 | Marriott |
| 3,508,361 A | 4/1970 | Ryder |
| 3,715,707 A | 2/1973 | Anderson |
| 3,893,260 A | 7/1975 | Cadiou |
| 3,898,427 A | 8/1975 | Levin et al. |
| 3,911,245 A | 10/1975 | O'Shaughnessy |
| 3,964,068 A | 6/1976 | Torii et al. |
| 3,995,142 A | 11/1976 | Ciardelli et al. |
| 4,009,734 A | 3/1977 | Sullivan |
| 4,023,008 A | 5/1977 | Durussel |
| 4,065,848 A | 1/1978 | Dery |
| 4,081,926 A | 4/1978 | Jardin |
| 4,124,054 A | 11/1978 | Spretnjak |
| 4,137,447 A | 1/1979 | Boaz |
| 4,158,270 A | 6/1979 | Cherbourg et al. |
| 4,171,594 A | 10/1979 | Colanzi |
| 4,244,774 A | 1/1981 | Dery |
| RE30,663 E | 6/1981 | Schnitzius |
| 4,300,408 A | 11/1981 | Yoshifuji |
| 4,388,522 A | 6/1983 | Boaz |
| 4,410,843 A | 10/1983 | Sauer et al. |
| 4,415,196 A | 11/1983 | Baum et al. |
| 4,450,346 A | 5/1984 | Boaz |
| 4,458,445 A | 7/1984 | Sauer et al. |
| 4,519,443 A | 5/1985 | Sutoh et al. |
| 4,552,611 A | 11/1985 | Dery et al. |
| 4,606,159 A | 8/1986 | Kunert |
| 4,611,849 A | 9/1986 | Trenkler |
| 4,635,398 A | 1/1987 | Nakamura |
| 4,674,231 A | 6/1987 | Radek et al. |
| 4,723,809 A | 2/1988 | Kida et al. |
| 4,738,052 A | 4/1988 | Yoshida |
| 4,785,583 A | 11/1988 | Kawagoe et al. |
| 4,883,940 A | 11/1989 | Tokarz |
| 4,920,698 A | 5/1990 | Friese et al. |
| 4,934,098 A | 6/1990 | Prouteau et al. |
| 4,970,911 A | 11/1990 | Ujihara et al. |
| 4,995,195 A | 2/1991 | Olberding et al. |
| 5,046,283 A | 9/1991 | Compeau et al. |
| 5,101,682 A | 4/1992 | Radisch, Jr. et al. |
| 5,146,712 A | 9/1992 | Hlavaty |
| 5,228,740 A | 7/1993 | Saltzman |
| 5,245,788 A | 9/1993 | Riegelman |
| 5,245,887 A | 9/1993 | Tanaka et al. |
| 5,294,168 A | 3/1994 | Kronbetter |
| 5,308,247 A | 5/1994 | Dyrdek |
| 5,333,411 A | 8/1994 | Tschirschwitz et al. |
| 5,345,717 A | 9/1994 | Mori et al. |
| 5,363,596 A | 11/1994 | Kronbetter |
| 5,367,827 A | 11/1994 | Tajima et al. |
| 5,442,880 A | 8/1995 | Gipson |
| 5,466,911 A | 11/1995 | Spagnoli et al. |
| 5,467,560 A | 11/1995 | Camp et al. |
| 5,473,840 A | 12/1995 | Gillen et al. |
| 5,505,023 A | 4/1996 | Gillen et al. |
| 5,522,191 A | 6/1996 | Wenner et al. |
| 5,525,401 A | 6/1996 | Hirmer |
| 5,531,046 A | 7/1996 | Kollar et al. |
| 5,542,214 A | 8/1996 | Buening |
| 5,572,376 A | 11/1996 | Pace |
| 5,613,323 A | 3/1997 | Buening |
| 5,617,675 A | 4/1997 | Kobrehel |
| 5,711,112 A | 1/1998 | Barten et al. |
| 5,716,536 A | 2/1998 | Yokoto et al. |
| 5,724,769 A | 3/1998 | Cripe et al. |
| 5,724,771 A | 3/1998 | Gipson |
| 5,784,833 A | 7/1998 | Sponable et al. |
| 5,799,444 A | 9/1998 | Freimark et al. |
| 5,799,449 A | 9/1998 | Lyons et al. |
| 5,822,922 A | 10/1998 | Grumm et al. |
| 5,836,110 A | 11/1998 | Buening |
| 5,839,476 A | 11/1998 | Blase |
| 5,853,895 A | 12/1998 | Lewno |
| 5,890,321 A | 4/1999 | Staser et al. |
| 5,953,887 A | 9/1999 | Lucas et al. |
| 5,996,284 A | 12/1999 | Freimark et al. |
| 5,997,793 A | 12/1999 | Lahnala |
| 6,014,840 A * | 1/2000 | Ray ............... B60J 1/1853 49/360 |
| 6,026,611 A | 2/2000 | Ralston et al. |
| 6,038,819 A | 3/2000 | Klein |
| 6,068,719 A | 5/2000 | Lewno |
| 6,086,138 A | 7/2000 | Xu et al. |
| 6,112,462 A | 9/2000 | Kolar |
| 6,119,401 A | 9/2000 | Lin et al. |
| 6,119,402 A | 9/2000 | Wisner |
| 6,125,585 A | 10/2000 | Koneval et al. |
| 6,161,894 A | 12/2000 | Chapman |
| 6,223,470 B1 | 5/2001 | Millard et al. |
| 6,225,904 B1 | 5/2001 | Jaffe et al. |
| 6,250,175 B1 | 6/2001 | Noetzold |
| 6,293,609 B1 | 9/2001 | Xu et al. |
| 6,319,344 B1 | 11/2001 | Lewno |
| 6,324,788 B1 | 12/2001 | Koneval et al. |
| 6,328,243 B1 | 12/2001 | Yamamoto |
| 6,490,832 B1 | 12/2002 | Fischbach et al. |
| 6,494,496 B1 | 12/2002 | Sweeney |
| 6,525,659 B2 | 2/2003 | Jaffe et al. |
| 6,591,552 B1 | 7/2003 | Rasmussen |
| 6,598,931 B2 | 7/2003 | Tamura |
| 6,691,464 B2 | 2/2004 | Nestell et al. |
| 6,742,819 B2 | 6/2004 | So et al. |
| 6,766,617 B2 | 7/2004 | Purcell |
| 6,846,039 B2 | 1/2005 | Lewno |
| 6,955,009 B2 | 10/2005 | Rasmussen |
| 7,003,916 B2 | 2/2006 | Nestell et al. |
| 7,010,883 B2 | 3/2006 | Jaerpsten et al. |
| 7,051,478 B2 | 5/2006 | Bourque et al. |
| 7,073,293 B2 | 7/2006 | Galer |
| 7,155,863 B2 | 1/2007 | Daniel et al. |
| 7,184,190 B2 | 2/2007 | McCabe et al. |
| 7,186,118 B2 | 3/2007 | Hansen et al. |
| 7,219,470 B2 | 5/2007 | Lahnala |
| 7,255,451 B2 | 8/2007 | McCabe et al. |
| 7,259,359 B2 | 8/2007 | Davey et al. |
| 7,332,225 B2 | 2/2008 | Lewno |
| 7,395,631 B2 | 7/2008 | Lahnala |
| 7,400,435 B2 | 7/2008 | Byers et al. |
| 7,437,852 B2 | 10/2008 | Dufour et al. |
| 7,608,949 B2 | 10/2009 | Busch |
| 7,626,749 B2 | 12/2009 | Baur et al. |
| 7,838,115 B2 | 11/2010 | Lewno |
| 7,871,272 B2 | 1/2011 | Firman, II et al. |
| 7,900,863 B1 | 3/2011 | Cheng |
| 7,934,342 B2 | 5/2011 | Lahnala |
| 7,963,070 B2 | 6/2011 | Recker |
| 8,042,664 B2 | 10/2011 | Rutkowski et al. |
| 8,069,615 B2 | 12/2011 | Heiman et al. |
| 8,127,498 B2 | 3/2012 | Lahnala |
| 8,151,519 B2 | 4/2012 | Bello et al. |
| 8,250,812 B2 | 8/2012 | Hebert et al. |
| 8,272,168 B2 | 9/2012 | Lahnala |
| 8,322,073 B2 | 12/2012 | Lewno |
| 8,402,695 B2 | 3/2013 | Smith et al. |
| 8,881,458 B2 | 11/2014 | Snider et al. |
| 8,915,018 B2 * | 12/2014 | Snider ............... B60J 1/1853 49/380 |
| 8,938,914 B2 | 1/2015 | Hulst et al. |
| 9,399,385 B2 * | 7/2016 | Tamarapoo ............ B60J 1/007 |
| 9,797,177 B2 * | 10/2017 | Gipson ............... E05F 11/488 |
| 9,920,560 B2 * | 3/2018 | Gipson ............... E05D 15/0682 |
| 10,239,397 B2 * | 3/2019 | Snider ............... B60J 10/74 |
| 10,266,037 B2 * | 4/2019 | Hulst ............... B60J 1/1853 |
| 2003/0074842 A1 | 4/2003 | Eckhardt et al. |
| 2003/0140562 A1 | 7/2003 | Staser et al. |
| 2003/0188487 A1 | 10/2003 | Rasmussen |
| 2003/0188490 A1 | 10/2003 | Kraus et al. |
| 2003/0213179 A1 | 11/2003 | Galer |
| 2004/0020131 A1 | 2/2004 | Galer et al. |
| 2004/0065017 A1 | 4/2004 | Priest et al. |
| 2004/0065018 A1 | 4/2004 | Regnier et al. |
| 2006/0032140 A1 | 2/2006 | Arimoto et al. |

(56) References Cited

U.S. PATENT DOCUMENTS

| | | |
|---|---|---|
| 2006/0061008 A1 | 3/2006 | Kamer et al. |
| 2006/0107600 A1 | 5/2006 | Nestell et al. |
| 2006/0130405 A1 | 6/2006 | Hemond et al. |
| 2006/0179966 A1 | 8/2006 | Kuo |
| 2007/0209283 A1 | 9/2007 | Ostrowski et al. |
| 2007/0277443 A1 | 12/2007 | Dery et al. |
| 2008/0122262 A1 | 5/2008 | Cicala |
| 2008/0127563 A1 | 6/2008 | Tooker |
| 2008/0155902 A1 | 7/2008 | Kaiser |
| 2008/0202032 A1 | 8/2008 | Loidolt |
| 2009/0071284 A1 | 3/2009 | Wen |
| 2009/0235773 A1 | 9/2009 | Wen |
| 2009/0235774 A1 | 9/2009 | Wen |
| 2009/0322705 A1* | 12/2009 | Halsey, IV ............... G06F 3/044 345/174 |
| 2010/0107505 A1 | 5/2010 | Schreiner et al. |
| 2010/0146859 A1* | 6/2010 | Gipson ................. B60J 1/1853 49/348 |
| 2010/0154312 A1* | 6/2010 | Gipson ............... E05D 15/0621 49/360 |
| 2010/0182143 A1 | 7/2010 | Lynam |
| 2010/0240229 A1 | 9/2010 | Firman, II et al. |
| 2010/0263290 A1 | 10/2010 | Pawloski et al. |
| 2010/0326231 A1 | 12/2010 | Kuo |
| 2011/0030276 A1* | 2/2011 | Smith ................... B60J 1/1853 49/70 |
| 2011/0034257 A1 | 2/2011 | Wen |
| 2011/0056140 A1 | 3/2011 | Lewno |
| 2011/0233182 A1 | 9/2011 | Baranski |
| 2011/0262087 A1 | 10/2011 | Bohler et al. |
| 2012/0091113 A1* | 4/2012 | Bennett ................. B60J 1/1853 219/203 |
| 2012/0091114 A1* | 4/2012 | Ackerman ............. B60J 1/1853 219/203 |
| 2012/0117880 A1* | 5/2012 | Lahnala ................ B60J 1/1853 49/70 |
| 2012/0139289 A1 | 6/2012 | Lahnala |
| 2012/0291353 A1* | 11/2012 | Gipson ................... B60S 1/026 49/70 |
| 2013/0068341 A1 | 3/2013 | Wen |
| 2013/0174488 A1* | 7/2013 | Snider ................... B60J 1/1853 49/70 |
| 2013/0255156 A1 | 10/2013 | Snider |
| 2013/0277352 A1 | 10/2013 | Degen et al. |
| 2013/0283693 A1* | 10/2013 | Huizen ................ E05F 11/488 49/123 |
| 2014/0047772 A1 | 2/2014 | Hulst |
| 2014/0091074 A1 | 4/2014 | Lisinski et al. |
| 2015/0298528 A1* | 10/2015 | Lahnala ................ B60J 1/1853 49/70 |
| 2016/0059675 A1 | 3/2016 | Snider |
| 2017/0238371 A1* | 8/2017 | Lahnala ................ B60J 1/1853 219/203 |
| 2017/0246984 A1* | 8/2017 | Snider ................... B60Q 1/268 |
| 2017/0297514 A1* | 10/2017 | Sekino ............... B60R 16/0215 |
| 2018/0141505 A1* | 5/2018 | Sekino ................. H02G 11/006 |
| 2018/0227986 A1* | 8/2018 | Snider ..................... H05B 3/86 |
| 2019/0123457 A1* | 4/2019 | Bulgajewski ............ H01R 4/04 |

\* cited by examiner

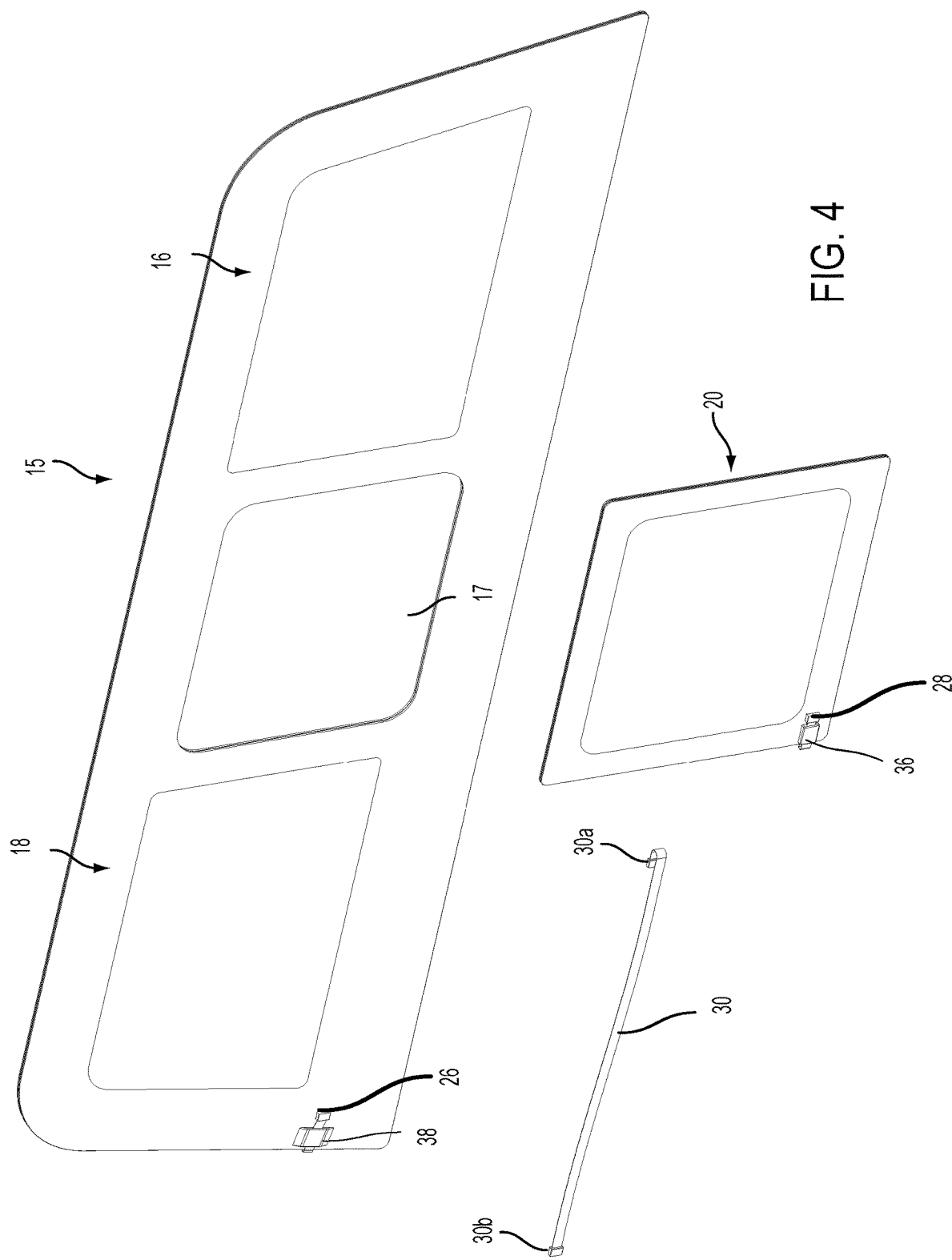

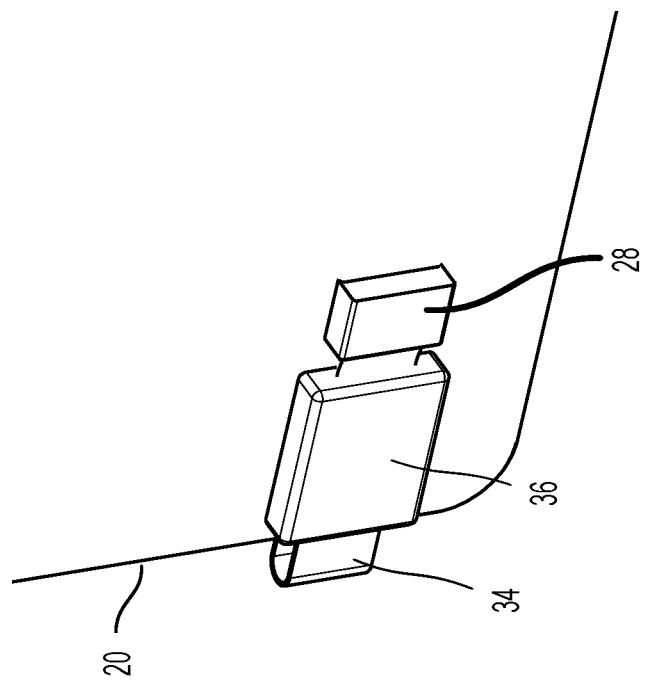
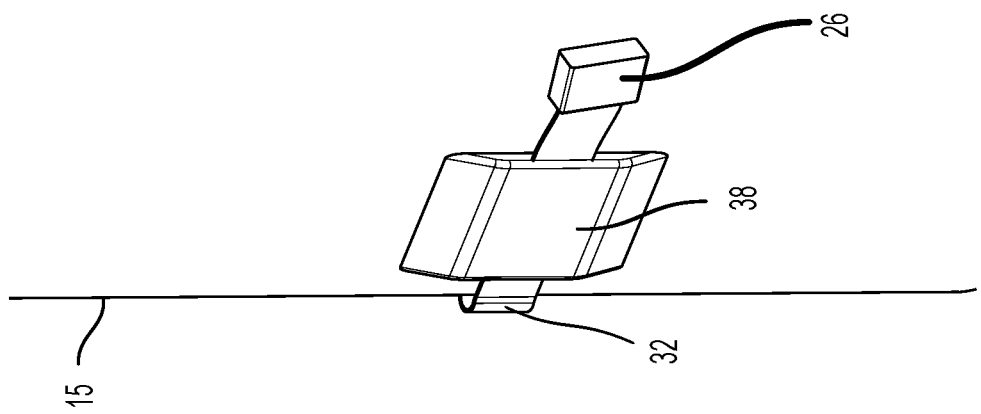
FIG. 4B
FIG. 4A

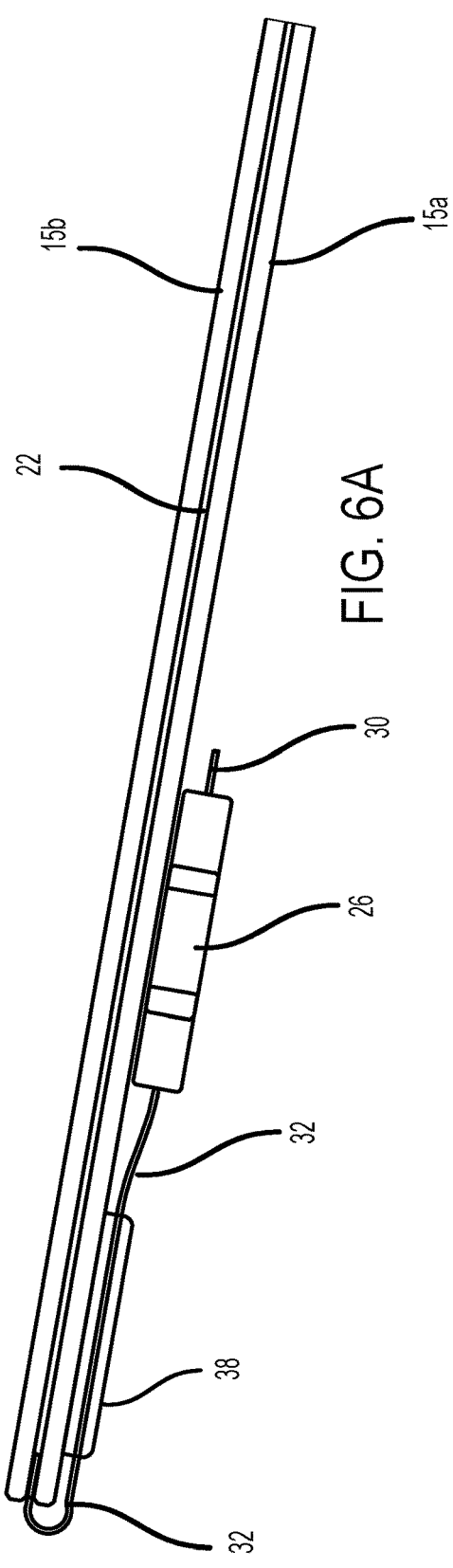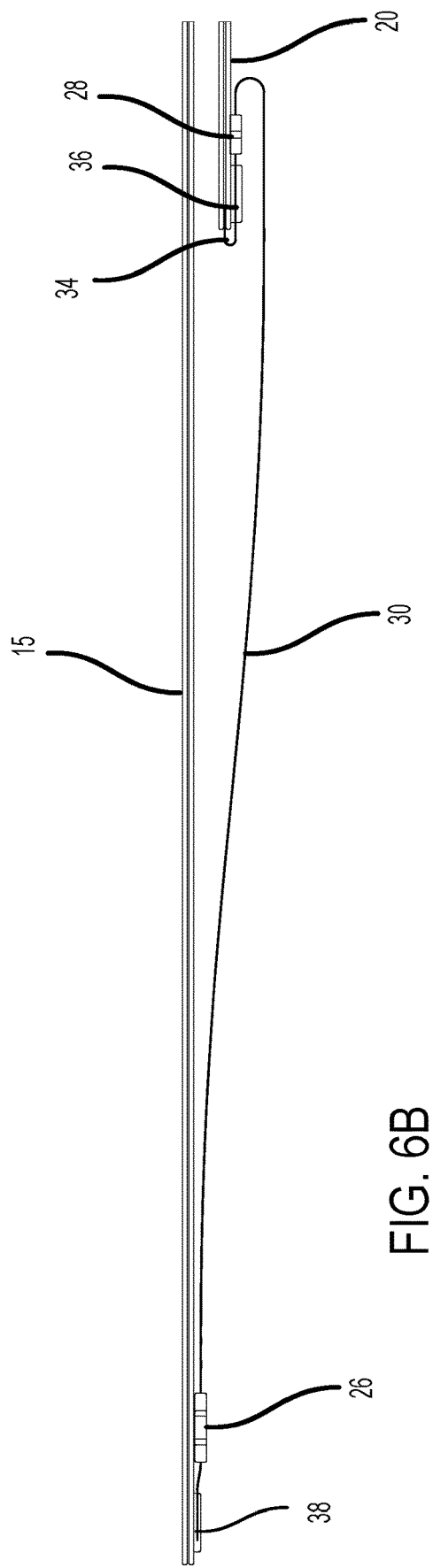

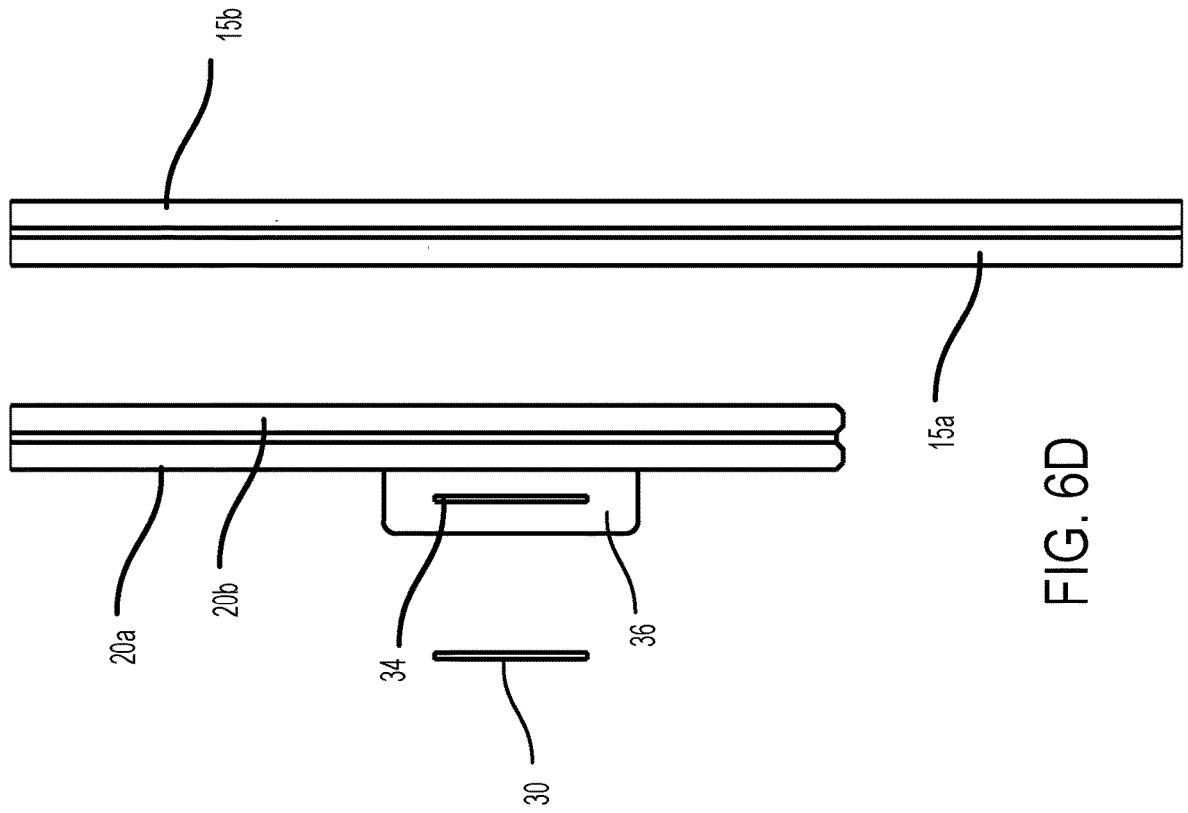
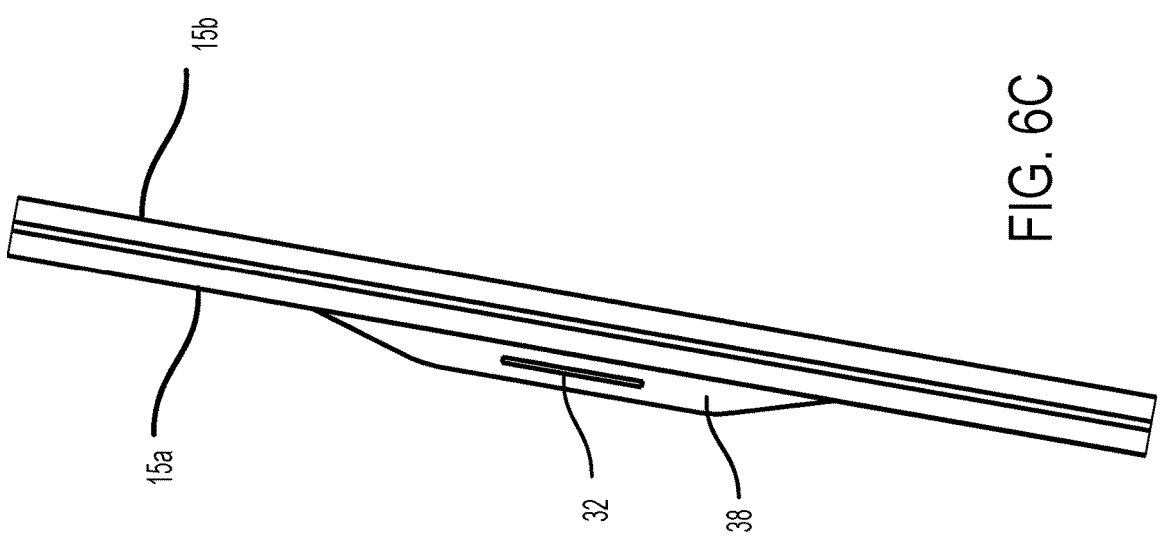
FIG. 6D
FIG. 6C

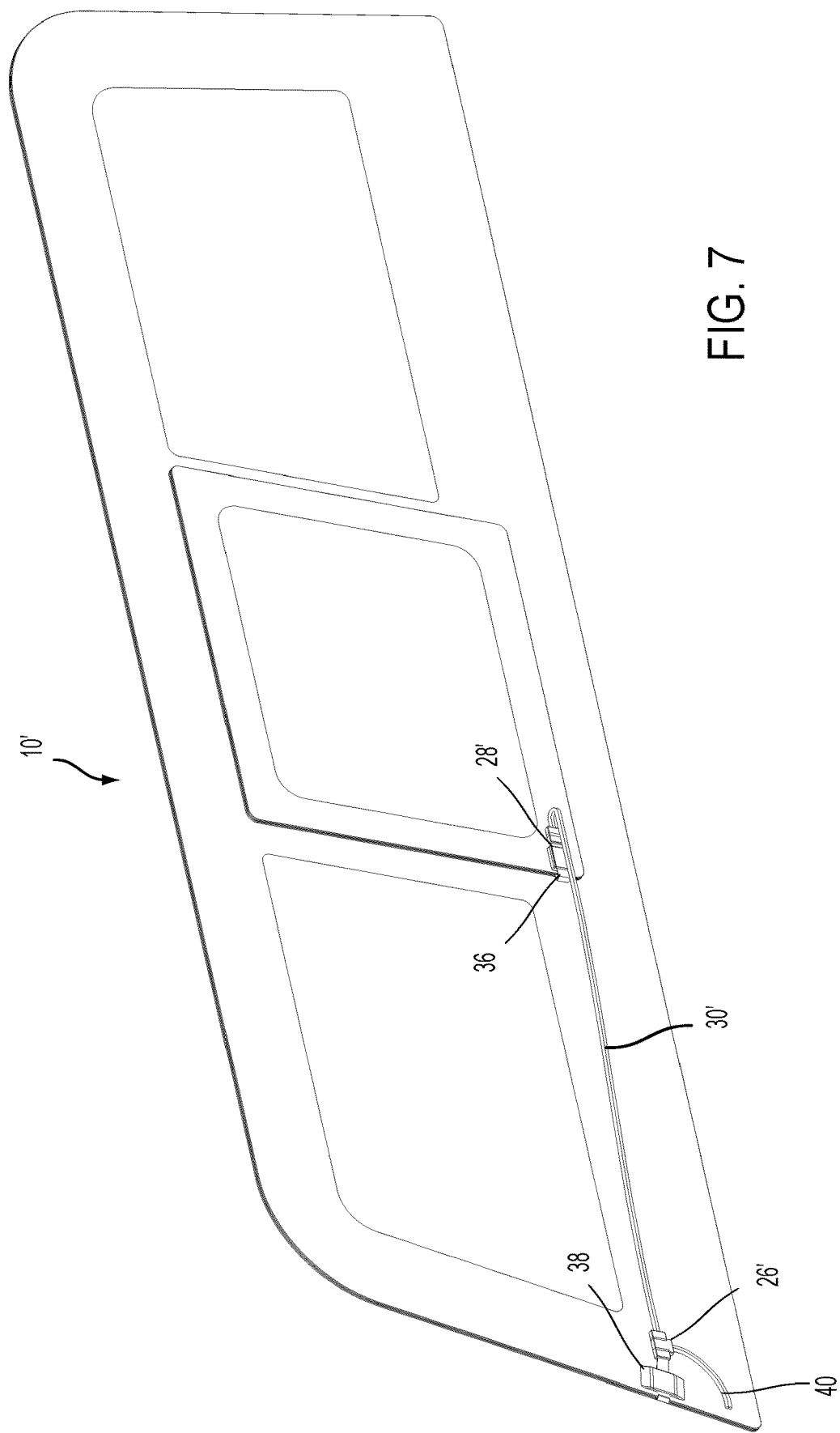

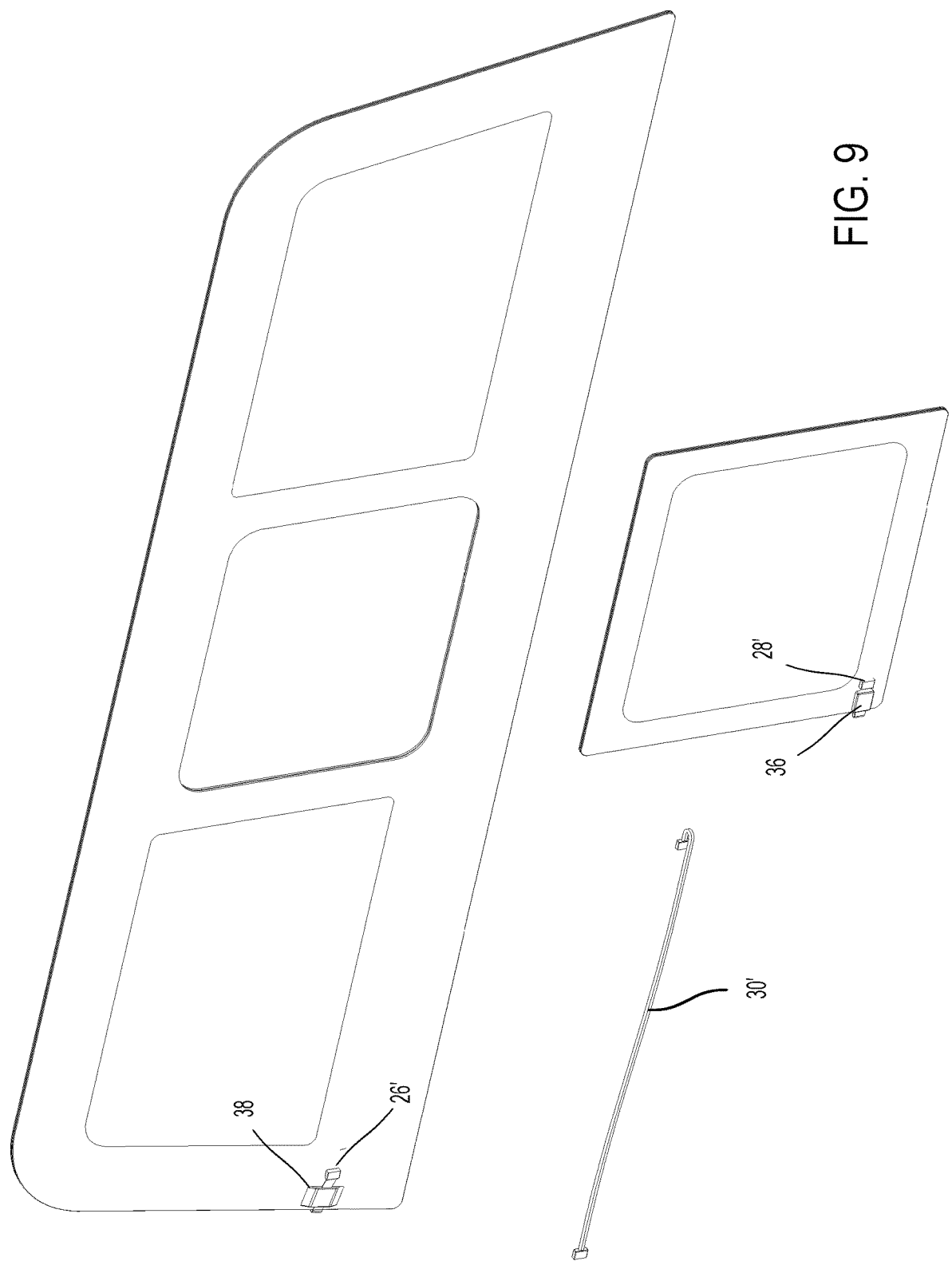

REAR SLIDER WINDOW ASSEMBLY WITH LAMINATED HEATING ELEMENT

CROSS REFERENCE TO RELATED APPLICATION

The present application claims the filing benefits of U.S. provisional application Ser. No. 62/456,845, filed Feb. 9, 2017, which is hereby incorporated herein by reference in its entirety.

FIELD OF THE INVENTION

The present invention relates to movable or slider window assemblies for vehicles and, more particularly to a side or rear slider window assembly for a vehicle.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window.

It is known to provide a heater grid at the window assembly to defog or defrost the window panels. The fixed window panels typically include respective heater grids that are electrically connected to a power source and are heated responsive to actuation of a user input. The movable window panel typically includes a heater grid that is electrically connected the power source when the movable window panel is closed, whereby electrical terminals at the movable window panel may be electrically connected to or in electrical contact with electrical terminals at the frame or latch, and whereby the movable window panel is not electrically connected to the power source when the movable window panel is opened or partially opened.

SUMMARY OF THE INVENTION

The present invention provides a rear slider window assembly that may provide for defogging or defrosting of the fixed and movable window panels of the rear slider window assembly. The window panels comprise laminated window panels with an electrically conductive heating element disposed between inner and outer glass substrates of the respective window panel. The window assembly of the present invention is operable to heat or defog or defrost the fixed and movable window panels via respective thin flat wires that extend from a connector region and wrap around a perimeter edge of the inner glass substrate so as to be received at or in the interpane cavity of the window panel to make electrical connection with the electrically conductive heating element disposed therein. The window assembly of the present invention is operable to heat or defog or defrost the movable window panel irrespective of whether the movable window panel is opened or partially opened or closed. The present invention thus provides enhanced capability of heating or defogging or defrosting (or providing electrical power to) the fixed window panel and the movable window panel (typically the center window panel).

These and other objects, advantages, purposes and features of the present invention will become apparent upon review of the following specification in conjunction with the drawings.

BRIEF DESCRIPTION OF THE DRAWINGS

FIG. 4 is an exploded perspective view of the rear slider window assembly of FIGS. 2 and 3;

FIG. 4A is an enlarged perspective view of the electrical connector and retaining element at the fixed window panel;

FIG. 4B is an enlarged perspective view of the electrical connector and retaining element at the movable window panel;

FIG. 6A is a sectional view of the portion of the rear slider window assembly of FIG. 6, taken along the line A-A in FIG. 6;

FIG. 6B is a sectional view of the portion of the rear slider window assembly of FIG. 6, taken along the line B-B in FIG. 6;

FIG. 6C is a sectional view of the portion of the rear slider window assembly of FIG. 6, taken along the line C-C in FIG. 6;

FIG. 6D is a sectional view of the portion of the rear slider window assembly of FIG. 6, taken along the line D-D in FIG. 6;

FIG. 7 is a perspective view of another rear slider window assembly, as viewed from the forward or interior side of the window assembly when the window assembly is normally mounted to a vehicle;

FIG. 9 is an exploded perspective view of the rear slider window assembly of FIGS. 7 and 8.

DESCRIPTION OF THE PREFERRED EMBODIMENTS

Figure 1:
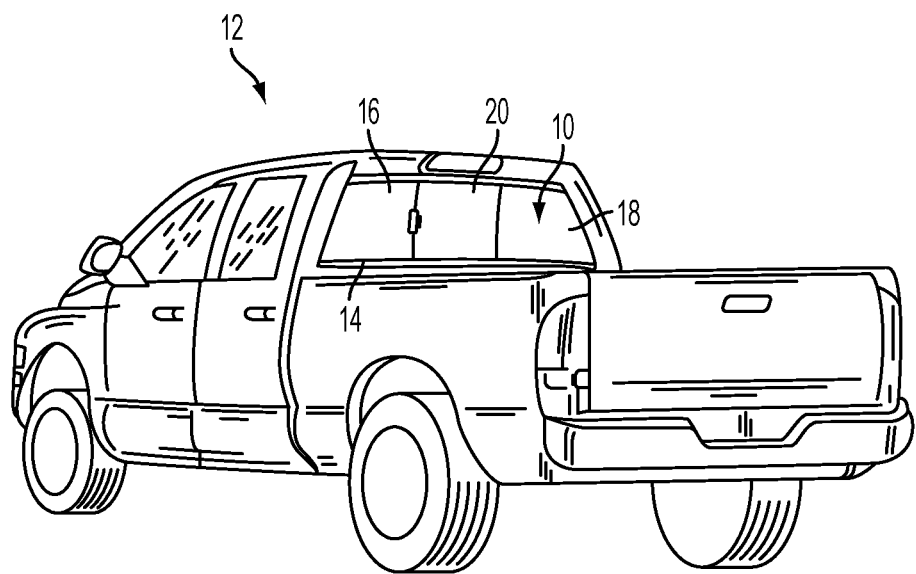
FIG. 1 is a rear perspective view of a pickup truck having a rear slider window assembly in accordance with the present invention.
Figure 2:
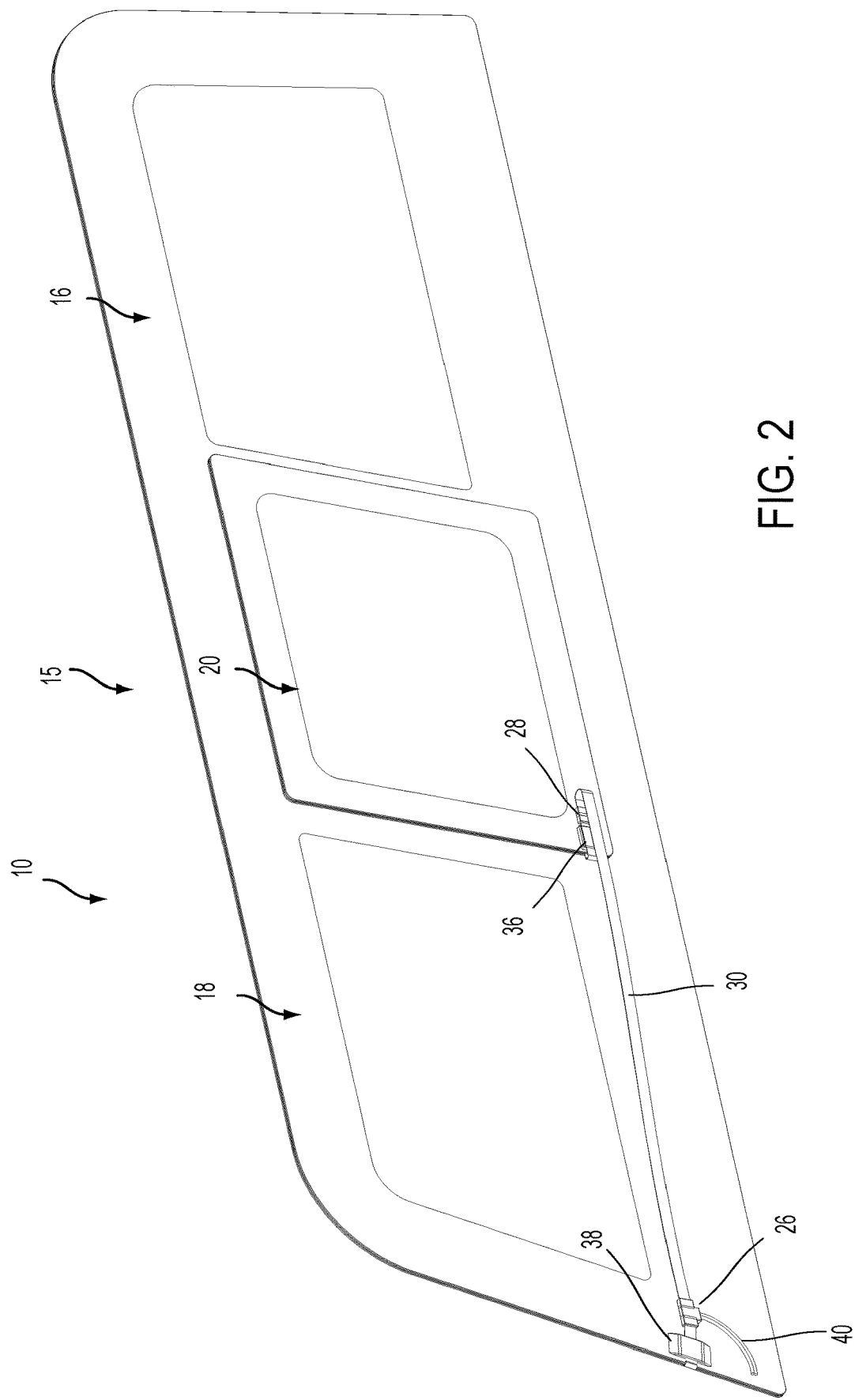
FIG. 2 is a perspective view of the rear slider window assembly, as viewed from the forward or interior side of the window assembly when the window assembly is normally mounted to a vehicle.
Figure 3:
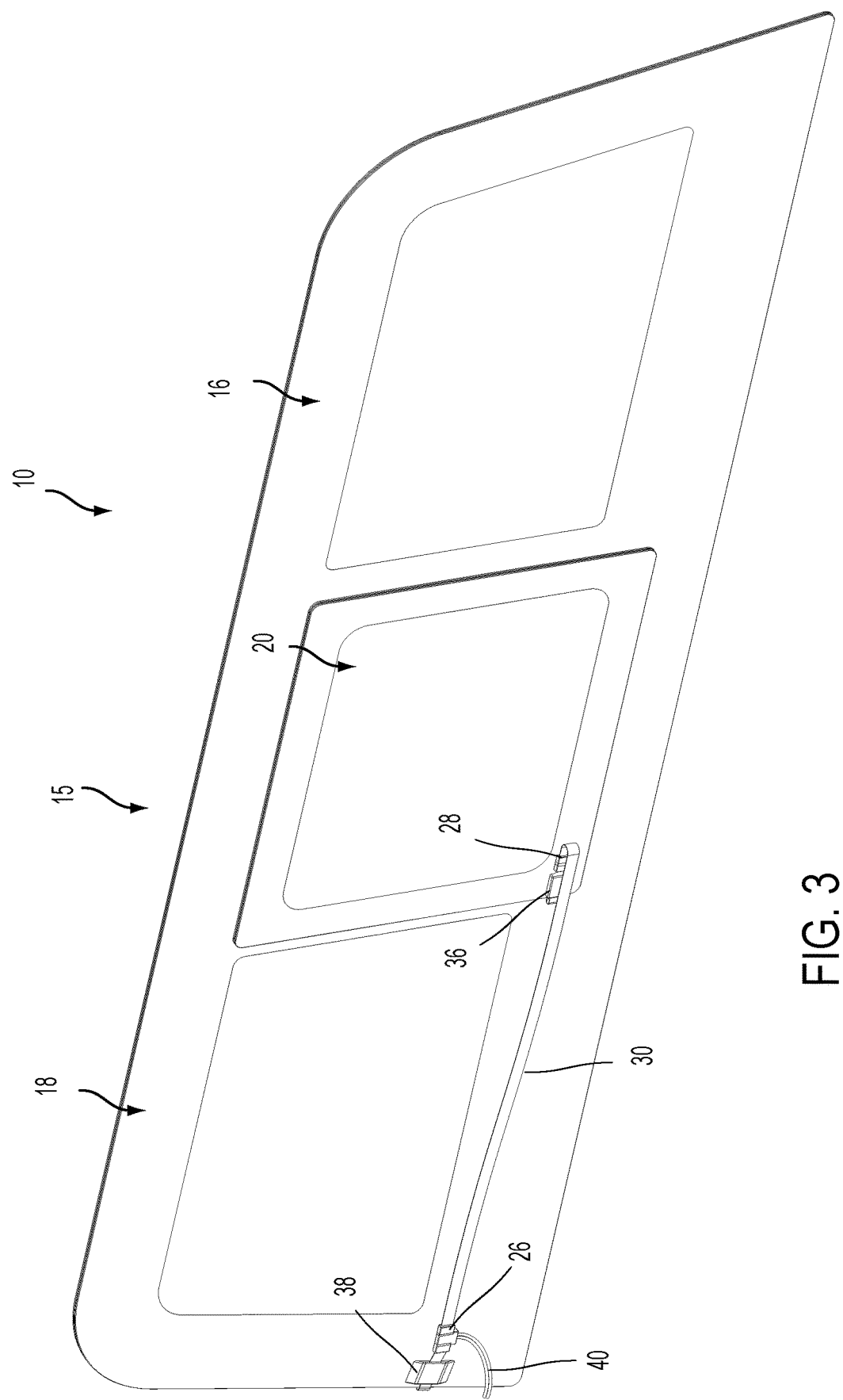
FIG. 3 is another perspective view of the rear slider window assembly of FIG. 2.

Referring now to the drawings and the illustrative embodiments depicted therein, a rear slider window assembly 10 of a vehicle 12 (such as a pickup truck or the like) includes a window frame 14, a fixed window panel 15 comprising a pair of spaced apart side fixed window panels or panel portions 16, 18 (which may be separate panels or part of a single panel 15 with an aperture 17) and a movable window panel 20 that is movable relative to frame 14 and fixed window panels 16, 18 between an opened position and a closed position.

In the illustrated embodiment, window assembly 10 includes a single fixed window having two window panels or portions 16, 18 that are spaced apart with an aperture or opening 17 formed through the fixed window panel to define an opening between the panel portions 16, 18. The slider or movable window panel 20 is movable along a lower rail and an upper rail of frame portion 14 to open and close the opening, such as in a manner similar to known slider window assemblies. Optionally, the slider window panel 20 may be disposed at a lower carrier that receives the lower perimeter edge region of the slider window panel 20 therein and that is slidably or movably received in the lower rail of frame portion 14.

The fixed window panel includes an electrically conductive heater element electrically operable element established therein, and the movable window panel 20 also includes an electrically conductive heater element established therein. The heater elements are electrically conductively connected to (or are otherwise in electrical conductive continuity with) a power source of the vehicle and may be powered (such as responsive to a user actuatable input or switch or button of the vehicle or responsive to a sensor or accessory of the vehicle) to heat or defrost or defog the fixed window panels 16, 18 and movable window panel 20, as discussed below.

The heater elements comprise laminated heating elements disposed between two sheets of glass of the fixed window panel or panels and the movable window panel, as also discussed below. For example, the fixed window panel 15 comprises a laminated fixed window panel having an inner glass substrate 15a and an outer glass substrate 15b, with the heater element or material 22 (such as a transparent metallic interlayer or element, such as a transparent silver layer or the like, such as, for example, a plurality of silver nano wires or the like) disposed or established or screened or printed or laminated between the substrates 15a, 15b. Likewise, the movable window panel 20 comprises a laminated movable window panel having an inner glass substrate 20a and an outer glass substrate 20b, with the heater element or material 24 (such as a transparent metallic interlayer or element, such as a transparent silver layer or the like, such as, for example, a plurality of silver nano wires or the like) disposed or established or screened or printed or laminated between the substrates 20a, 20b. The heater elements 22, 24 may comprise any suitable material or element or layer or film or traces that heats when electrically powered, such as an electrically conductive coating or layer or the like that, due to its resistivity, heats when a current is applied thereto.

The heating element of movable window panel 20 is powered in a manner that allows for heating or defogging or defrosting of the movable window panel irrespective of whether the movable window panel is opened or partially opened or closed, as discussed below. In the illustrated embodiments, the electrical connection between the vehicle power source and the movable panel heating element is made via a flexible flat wire or cable, such as by utilizing aspects of the rear slider window assemblies described in U.S. Pat. Nos. 8,938,914; 8,881,458 and/or 8,402,695, and/or U.S. Publication No. US-2016-0059675, which are hereby incorporated herein by reference in their entireties.

The rear slider window assembly 10 provides electrical connections or terminals 26 at the fixed window panel 15 (such as at the inner surface of the fixed window panel) and electrical connections or terminals 28 at the movable window panel 20 (such as at the inner surface of the movable window panel), with the terminals 26, 28 being electrically connected via a flexible electrically conductive connector 30 having its ends secured to and electrically connected to the respective terminals. The terminals may comprise any suitable terminals or contacts to which the flexible connector 30 can attach. For example, each terminal connector 26, 28 may comprise a plug-socket type connector that is adhesively attached or bonded at the inner surface of the respective window panel, whereby the flexible connector can be electrically connected to terminals or conductive elements of the respective connector, such as via a plug-socket type connection (and with the flat thin connector extending from the opposite end of the connector from where the flexible connector is connected). For terminal connector 26, a second plug-socket type connection may be provided for the vehicle wire harness, such that, when the window assembly is installed in a vehicle, the vehicle wire harness may be readily electrically connected to the connector 26 to provide electrical power (when a heater function is activated) to the heating elements of the fixed window panel and the movable window panel.

In the illustrated embodiment, the terminals are part of respective electrical connectors that the respective ends 30a, 30b of the flexible connector 30 may plug into or otherwise electrically connect and mechanically connect. Thus, the flexible connector 30 may electrically connect between the terminals or connector 26 at the fixed window panel 15 and the terminals or connector 28 at the movable window panel 20 to provide electrical connection between the window panels throughout the opening and closing movement of the movable window panel.

The connectors 26, 28 are electrically connected to the respective heatable electrically conductive interlayer 22, 24 via a respective flat connector or nano wire 32, 34. For example, and as best shown in FIGS. 4, 4B, 6 and 6D, the connector 28 is disposed at the inner surface of the movable window panel 20 and is electrically connected to the end 30a (FIG. 4) of flexible connector 30 (such as via a plug-socket connection or any other suitable electrically conductive connecting means), which extends from the connector 28 toward the side of the fixed window panel. The connector 28 is also electrically connected to the interlayer 24 of the movable window panel 20 via a thin flat wire or connector 34, which extends from the connector 28 and wraps around the perimeter edge of the inner glass panel 20a of the window panel 20 so as to be received at and between the glass panels 20a, 20b to electrically connect to the interlayer 24. An overmolding or retaining element 36 is disposed or molded or adhered or bonded at the inner surface of the window panel 20 and between the connector 28 and the perimeter edge at which the flat wire 34 wraps around, in order to hold the flat wire fixed and non-movable relative to the movable window panel and the window assembly to limit flexing or movement of the wire 34 and to relieve stress at the wire by where it bends to wrap around the perimeter edge of the inner glass panel 20a of the laminated movable window panel 20.

Figure 5:
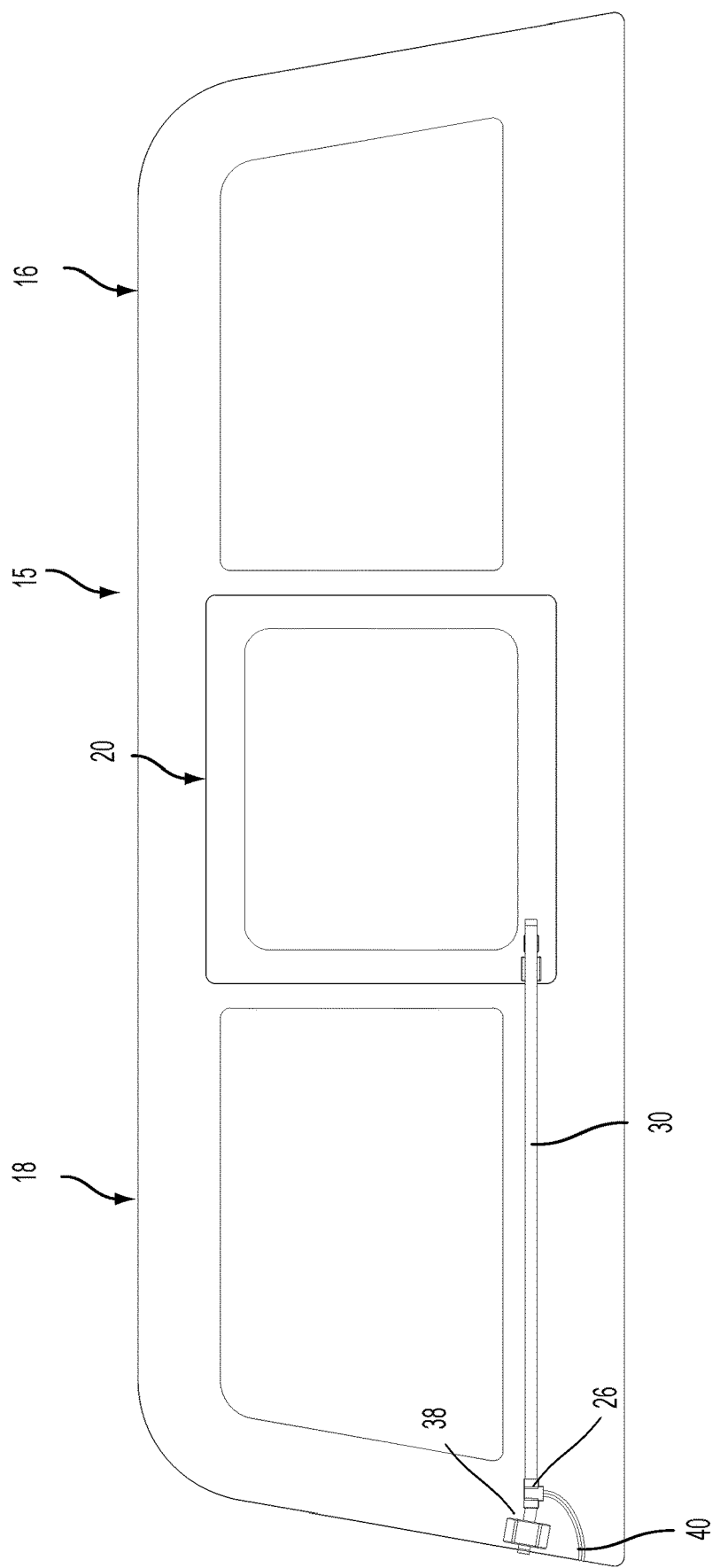
FIG. 5 is a plan view of the rear slider window assembly of FIGS. 2-4.
Figure 6:
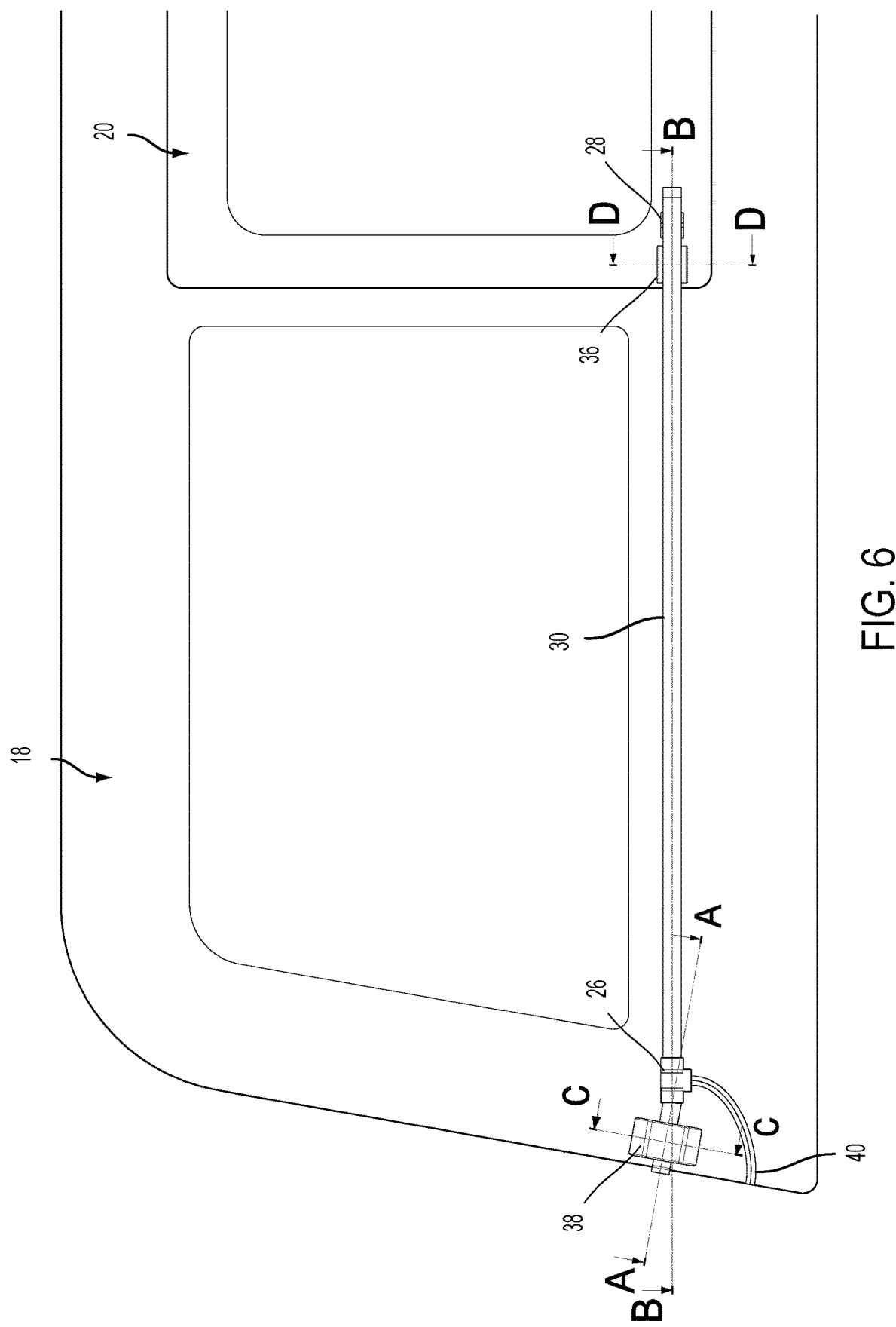
FIG. 6 is an enlarged plan view of a portion of the rear slider window assembly of FIG. 5.

Similarly, and as best shown in FIGS. 4A and 6A, the connector 26 is disposed at the inner surface of the fixed window panel 15 and is electrically connected to the end 30b (FIG. 4) of flexible connector 30 (such as via a plug-socket connection or any other suitable electrically conductive connecting means), which extends from the terminal connector 26 toward the movable window panel. The connector 26 is also electrically connected to the interlayer 22 via the flat wire or connector 32, which extends from the connector 26 and wraps around the perimeter edge of the inner glass panel 15a of the fixed window panel 15 so as to be received at and between the glass panels 15a, 15b to electrically connect to the interlayer 22. An overmolding or retaining element 38 is disposed or molded or adhered or bonded at the inner surface of the window panel 15 and between the connector 26 and the perimeter edge at which the flat wire 32 wraps around, in order to hold the flat wire fixed and non-movable relative to the window assembly to limit flexing or movement of the wire 32 and to relieve stress at the wire by where it bends to wrap around the perimeter edge of the inner glass panel 15a of the laminated fixed window panel 15. As can be seen with reference to FIGS. 5 and 6, the flat wire 32 and retaining element 38 are angled relative to the connector 26 and flexible connector 30, so that the flat wire 32 extends perpendicularly from the perimeter edge that it wraps around (to limit twisting or bending of the wire). As shown in FIGS. 2, 3, 5 and 6, the connector 26 is configured to also electrically connect to a vehicle wire harness or electrical connector 40 to provide electrical power to the wires 30, 32 at the connector 26. In the illustrated embodiment, the connector 26 is a T-shaped connector, with the flexible connector 30 connecting at one side, and the wires 32 connecting at the other side, and with the wire harness 40 connecting at a lower plug or socket of the connector 26 to provide electrical current to both the wires/connectors 30, 32.

Thus, the window assembly uses a thin flat electrically conductive element or wire to electrically connect between terminals or connectors attached at or disposed at the window panel and the electrically conductive heatable interlayer of that window panel. The flat wires may comprise any suitable very thin wires that can make electrical connection to the interlayer element of the window panel. Optionally, the thin flat electrically conductive elements may comprise electrically conductive coatings or traces that are established at the surface and edge of the window panel and that wrap around the edge of the glass substrate to provide electrical connection to the conductive interlayer of the window panel.

The overmolded or bonded retaining elements at the terminals hold the small wires in a fixed position to reduce strain in the wires at the wraparound of the perimeter edge of the glass substrate. Although shown as separate elements at or near the respective perimeter edges, the retaining elements may be established over the respective electrical connectors 26, 28 and/or over the thin wire at the wraparound region at the perimeter edge of the glass substrate, while remaining within the spirit and scope of the present invention. Although not shown, the flexible wire 30 and the connectors 26, 28 and the thin wires 32, 34 may be covered by a plastic cover element that protects and conceals the wires and connectors at the inner surface of the window assembly. Thus, the window assembly provides electrical connection to electrically conductive interlayers from terminals at the movable panel and fixed panel via nano wire or flat wires. The vehicle wire harness connects to the terminals at the fixed window panel to provide electrical power for the interlayers of the fixed and movable window panels.

In the illustrated embodiment of FIGS. 2-6, the window assembly includes a flexible connector 30 that comprises a flat electrical connector or wire that flexes in one direction, while limiting flexing in the other direction (such as in a vertical direction in FIG. 5). For example, one end of the wires of flexible cable 30 may be connected to a pair of terminals of the connector at the fixed window panel 16, while the other end of the wires of flexible cable 30 may connect to a pair of terminals of the connector at movable window panel 20 (where the terminals are electrically conductively connected to or established with the heater element of movable window panel 20).

The window assembly 10 may include a wire guide or cover element that is attached (such as via an adhesive or the like) to or formed with the lower channel or rail, and that extends partially along the lower rail or channel of the frame portion 14 of window assembly 10. The cover element includes an attaching portion that is attached to lower rail and includes a wire guide portion or channel that is disposed at or above the lower rail and that receives flexible cable 30 therein to guide and conceal the flexible cable during movement of the movable window panel between its opened and closed positions. Examples of such a wire guide or cover element are described in U.S. Pat. Nos. 8,938,914; 8,881,458 and/or 8,402,695, and/or U.S. Publication No. US-2016-0059675, which are hereby incorporated herein by reference in their entireties.

Thus, the flexible cable 30 is routed along and within the guide element or channel to control and guide and conceal the flexible cable. The cover element conceals the flexible cable from view and substantially encases the flexible cable to guide or control the flexing of the cable and to protect the cable from exposure at the window panel. The thin flat wires 26, 28 provide electrical connection between the terminals at which the flexible cable attaches and the respective electrically conductive interlayer of the respective window panel. The cover element may also conceal the thin flat wires and the retaining elements.

Figure 8:
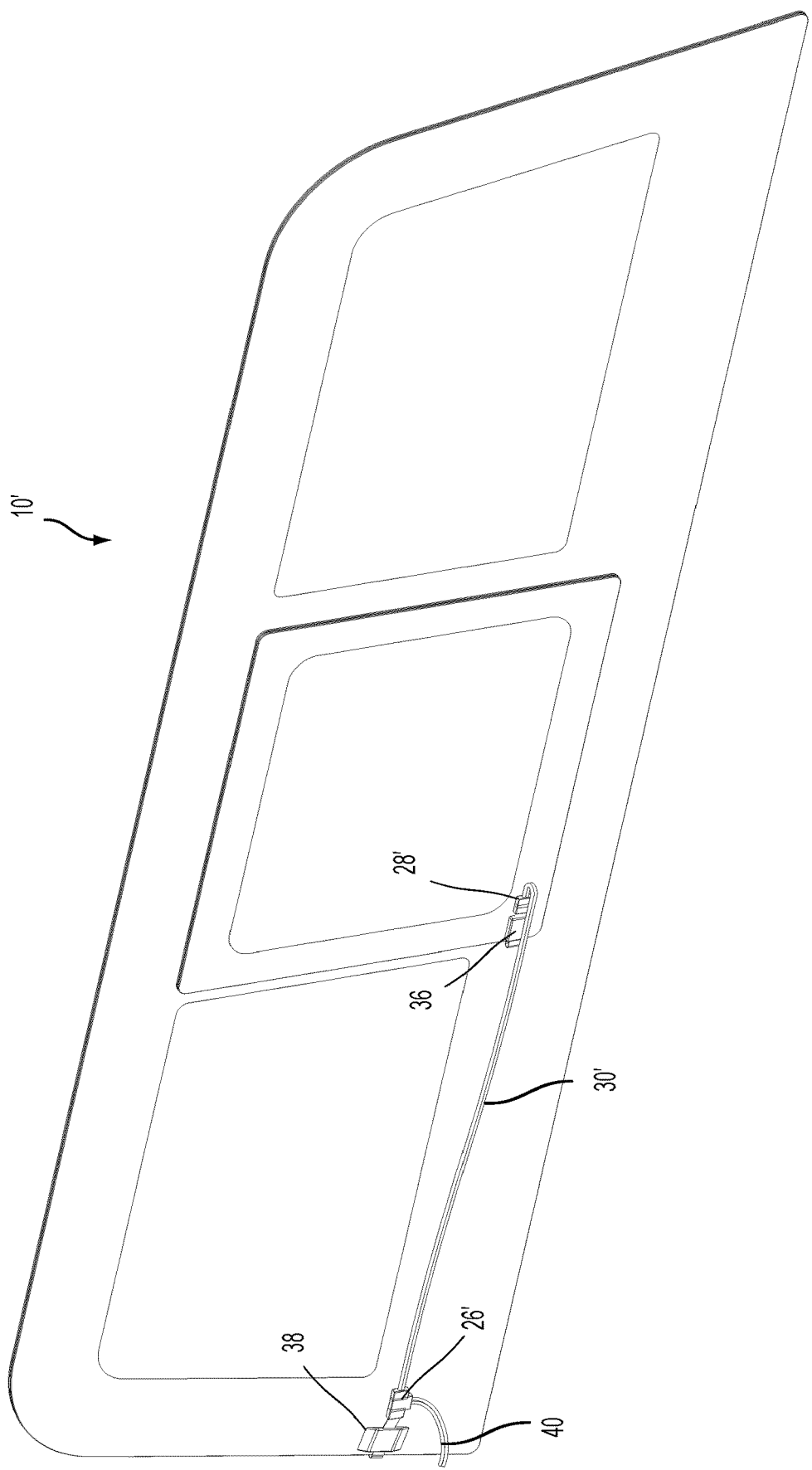
FIG. 8 is another perspective view of the rear slider window assembly of FIG. 7.

The electrical connections between the connectors 26 and 28 to power the movable panel heating element may be made via any suitable flexible connector or wire or cable or spooled cable or any suitable electrically conductive connection between the terminals at the fixed window panel and the terminals at the movable window panel or the like, such as by utilizing aspects of the rear slider window assemblies described in U.S. Pat. Nos. 8,938,914; 8,881,458 and/or 8,402,695, and/or U.S. Publication No. US-2016-0059675, which are hereby incorporated herein by reference in their entireties. Optionally, for example, and such as shown in FIGS. 7-9, a rear slider window assembly 10' may include a flexible dual wire cable 30' that electrically connects between terminals or connector 26' of the fixed window panel and terminals or connector 28' of the movable window panel. The window assembly 10' may otherwise be similar to window assembly 10, discussed above, such that a detailed discussion of the window assemblies need not be repeated herein.

Thus, the flexible wire or cable functions to provide electrical connection to the heater element of the movable window panel throughout the range of motion of the movable window panel between its fully closed position and its fully opened position. As the window panel is moved towards its opened position, the one end of the flexible cable moves with the movable window panel while the flexible cable flexes to allow for such movement. The slider or movable window panel may be movable towards the driver or left side of the vehicle when at least partially opened, or the slider may be moved in the other direction, with the components being generally reversed, depending on the particular application of the rear slider window assembly.

The movable or slider window panel is movable such as via manual pushing or pulling at the window panel or in response to actuation of a drive motor of a drive motor assembly or system, which may move cables or the like to impart horizontal movement of the slider window panel along the rails. Optionally, the drive motor assembly may utilize aspects of the drive assemblies of the types described in U.S. Pat. Nos. 4,920,698; 4,995,195; 5,146,712; 5,531,046; 5,572,376; 6,119,401; 6,955,009 and/or 7,073,293, and/or U.S. Publication Nos. 2004/0020131 and/or 2008/0127563, which are all hereby incorporated herein by reference in their entireties.

Optionally, the window assembly or assemblies of the present invention may utilize aspects of the window assemblies described in U.S. Pat. Nos. 8,402,695; 7,073,293;

7,003,916 and/or 6,691,464, and/or U.S. Publication Nos. 2013/0174488; 2006/0107600; 2008/0127563; 2004/0020131 and/or 2003/0213179, which are hereby incorporated herein by reference in their entireties. Although shown and described as a horizontally movable center window that moves relative to a single fixed window panel and/or frames (such as for a rear or side opening of a vehicle or the like), it is envisioned that the present invention is applicable to other types of movable window assemblies, such as horizontally movable window panels that move relative to a pair of opposite side windows (such as for applications at the rear of a cab of a pickup truck or the like), and/or such as vertically movable window panels that move relative to one or more fixed panels and/or frames (such as for a rear or side opening of a vehicle or the like), while remaining within the spirit and scope of the present invention.

Thus, the present invention provides a movable slider window assembly with a movable window that is moved along rails between an opened and closed position relative to a fixed window panel and aperture or opening formed through the fixed window panel (such as by utilizing aspects of the window assemblies described in U.S. Pat. Nos. 8,322,073; 7,838,115; 7,332,225; 6,846,039; 6,319,344; 6,068,719 and 5,853,895, and/or U.S. Pub. No. US-2011-0056140, which are all hereby incorporated herein by reference in their entireties). The fixed window panel is adhered or bonded to the vehicle body and the window assembly may include water drainage receiving conduits for channeling or guiding water draining from the lower rail through the adhesive or sealant bead between the fixed window panel and the vehicle body to drain water from the window assembly. The movable window panel thus is movable along the rails and may move between an opened position, where the movable window is disposed inward of the fixed window panel, and a closed position, where the movable window is disposed at the opening in the fixed window panel and at least partially in the opening to provide a generally flush or continuous exterior surface of the fixed and movable window panels when the movable window panel is closed.

Optionally, other means for establishing and maintaining electrical connection to the heater element of the movable window panel throughout the range of motion of the movable window panel may be implemented while remaining within the spirit and scope of the present invention. Although shown and described as a rear slider window assembly having a single fixed window panel and a single horizontally movable window panel, other slider window configurations may be implemented while remaining within the spirit and scope of the present invention. For example, a window assembly may have a pair of spaced apart fixed window panels (which may have separate heating elements electrically connected to one another or to a separate vehicle wire harness) and/or may have one or more movable window panels that is/are movable relative to the fixed window panel(s) between opened and closed positions while the heater element of the movable window panel/panels remain electrically conductively connected to a power source so that the heater element may be powered irrespective of whether the movable window is opened or closed. Optionally, it is envisioned that aspects of the present invention may be suitable for a vertically movable window panel that has one or more movable window panels that is/are vertically movable relative to one or more fixed window panels of the window assembly.

Although shown and described as having a heater element and providing electrical power or current to the heater element to heat or defog or defrost the movable window panel of the rear slider window assembly, it is envisioned that electrical power/current may be provided to the movable window panel (when the movable window panel is closed and at least partially opened) for other functions or purposes while remaining within the spirit and scope of the present invention. For example, electrical power or electrical current or electrically conductive connections may be provided to the movable glass window panel for connecting to a radio antenna established at the movable window panel and/or carrier of the movable window panel (such as for receiving radio antenna signals or the like), or for powering/controlling lights and/or sensors (such as imaging sensors or photosensors or security/motion sensors or the like) established at the movable window panel and/or carrier or frame of the movable window panel, or for powering/controlling an electrical auto-dimming/shading glass panel (such as an electro-optic or electrochromic glass panel or the like) to provide a dimming/shading feature to the movable glass window panel, and/or the like. The electrical connections or electrically conductive connections to the movable window panel allow for provision of electrical power/current to the accessories or features or content of the movable window panel or at the movable window panel and/or may provide a data/signal transmitting/receiving function for the accessories or features or content of or at the movable window panel, with the connections providing such power/current/transmission/communication irrespective of the position of the movable window panel between its fully closed position and its fully opened position.

Changes and modifications to the specifically described embodiments may be carried out without departing from the principles of the present invention, which is intended to be limited only by the scope of the appended claims, as interpreted according to the principles of patent law.

The invention claimed is:

1. A rear slider window assembly for a vehicle, said rear slider window assembly comprising:

a fixed window panel having an inner surface and an outer surface;

a frame portion fixedly attached at an inner surface of said fixed window panel;

a movable window panel having an inner surface and an outer surface and being movable along said frame portion, wherein said movable window panel is movable between a closed position and an opened position;

wherein said movable window panel comprises a laminated glass panel having an electrical element disposed between an inner glass panel and an outer glass panel of said laminated glass panel;

wherein, with said rear slider window assembly installed on a vehicle, said electrical element is in electrical connection with a wire harness of the vehicle and remains in electrical connection with the wire harness of the vehicle irrespective of whether said movable window panel is in the opened position or the closed position;

wherein said electrical element of said movable window panel is in electrical connection with the wire harness of the vehicle by a flexible connector that has one end electrically connected to a first electrical connector on said inner surface of said movable window panel, and wherein another end of said flexible connector is electrically connected to a second electrical connector on said inner surface of said fixed window panel; and wherein said first electrical connector is electrically connected to said electrical element by a wraparound connector that extends from said first electrical connector on said inner surface of said movable window panel and wraps around a perimeter edge of said inner glass panel of said movable window panel to electrically connect to said electrical element disposed between said inner glass panel and said outer glass panel of said laminated glass panel.

2. The rear slider window assembly of claim 1, wherein said electrical element comprises a transparent heating element disposed between said inner and outer glass panels of said movable window panel.

3. The rear slider window assembly of claim 1, wherein said flexible connector flexes in response to movement of said movable window panel relative to said fixed window panel, and wherein said flexible connector is flexible in a flexing direction while being non-flexible in a non-flexing direction, said non-flexing direction being transverse to said flexing direction.

4. The rear slider window assembly of claim 1, wherein said wraparound connector comprises a flat wire.

5. The rear slider window assembly of claim 1, comprising a retaining element that encapsulates a portion of said wraparound connector between said first electrical connector and said perimeter edge of said inner glass panel of said movable window panel.

6. The rear slider window assembly of claim 5, wherein said retaining element is overmolded at said inner surface of said movable window panel to encapsulate said portion of said wraparound connector to retain said wraparound connector relative to said movable window panel.

7. The rear slider window assembly of claim 1, wherein said fixed window panel comprises a laminated fixed window panel having a second electrical element disposed between an inner glass panel and an outer glass panel of said laminated fixed window panel.

8. The rear slider window assembly of claim 7, wherein, with said rear slider window assembly installed on the vehicle, said second electrical element is in electrical connection with the wire harness of the vehicle by a second wraparound connector that extends from said second electrical connector and wraps around a perimeter edge of said inner glass panel of said fixed window panel.

9. The rear slider window assembly of claim 8, comprising a retaining element that encapsulates a portion of said second wraparound connector between said second electrical connector and said perimeter edge of said inner glass panel of said fixed window panel.

10. The rear slider window assembly of claim 9, wherein said retaining element is overmolded at said inner surface of said fixed window panel to encapsulate said portion of said second wraparound connector to retain said second wraparound connector relative to said fixed window panel.

11. The rear slider window assembly of claim 8, wherein said second electrical element comprises a transparent heating element disposed between said inner and outer glass panels of said fixed window panel.

12. The rear slider window assembly of claim 1, wherein said second electrical connector is configured to electrically connect to the wire harness of the vehicle when said rear slider window assembly is installed on the vehicle.

13. The rear slider window assembly of claim 1, wherein said first and second electrical connectors are configured to electrically connect to respective ends of said flexible connector by a respective plug-socket connection.

14. The rear slider window assembly of claim 1, wherein said fixed window panel comprises a single fixed window panel with an aperture formed therethrough, and wherein said movable window panel is movable relative to said aperture between the closed position and the opened position.

15. The rear slider window assembly of claim 1, wherein said fixed window panel comprises a first fixed window panel and wherein said rear slider window assembly comprises a second fixed window panel with an opening between said first and second fixed window panels, and wherein said movable window panel is movable relative to said opening between the closed position and the opened position.

16. A rear slider window assembly for a vehicle, said rear slider window assembly comprising:
 a fixed window panel having an inner surface and an outer surface;
 a frame portion fixedly attached at an inner surface of said fixed window panel;
 a movable window panel having an inner surface and an outer surface and being movable along said frame portion, wherein said movable window panel is movable between a closed position and an opened position;
 wherein said movable window panel comprises a laminated glass panel having a first heater element disposed between an inner glass panel and an outer glass panel of said laminated glass panel;
 wherein said movable window panel has a first electrical connector disposed on said inner surface of said movable window panel, and wherein said first electrical connector is electrically connected to said first heater element by a first wraparound connector that extends from said first electrical connector on said inner surface of said movable window panel and wraps around a perimeter edge of said inner glass panel of said movable window panel and electrically connects to said first heater element disposed between said inner glass panel and said outer glass panel of said laminated glass panel;
 a first retaining element that encapsulates a portion of said first wraparound connector between said first electrical connector and said perimeter edge of said inner glass panel of said movable window panel;
 wherein said fixed window panel comprises a laminated fixed glass panel having a second heater element disposed between an inner glass panel and an outer glass panel of said laminated fixed glass panel;
 wherein said fixed window panel has a second electrical connector disposed on said inner surface of said fixed window panel, and wherein said second electrical connector is electrically connected to said second heater element by a second wraparound connector that extends from said second electrical connector on said inner surface of said fixed window panel and wraps around a perimeter edge of said inner glass panel of said laminated fixed glass panel and electrically connects to said second heater element disposed between said inner glass panel and said outer glass panel of said laminated fixed glass panel;
 wherein said first electrical connector is electrically connected to said second electrical connector by a flexible connector that maintains electrical connection to said first and second electrical connectors irrespective of whether said movable window panel is in the opened position or the closed position; and
 wherein, with said rear slider window assembly installed on a vehicle, said first electrical connector and said second electrical connector are in electrical connection with a wire harness of the vehicle.

17. The rear slider window assembly of claim 16, wherein said first retaining element is overmolded on said inner surface of said movable window panel to encapsulate said portion of said first wraparound connector to retain said first wraparound connector relative to said movable window panel.

18. The rear slider window assembly of claim 16, comprising a second retaining element that encapsulates a portion of said second wraparound connector between said second electrical connector and said perimeter edge of said inner glass panel of said fixed window panel.

19. The rear slider window assembly of claim 18, wherein said second retaining element is overmolded on said inner surface of said fixed window panel to encapsulate said portion of said second wraparound connector to retain said second wraparound connector relative to said fixed window panel.

20. The rear slider window assembly of claim 16, wherein said first and second electrical connectors are configured to electrically connect to the wire harness of the vehicle when said rear slider window assembly is installed on the vehicle by a third electrical connector disposed on said inner surface of said fixed window panel.

* * * * *